June 24, 1930.   G. CATTANEO ET AL   1,766,281
CONTINUOUS TREATMENT OF HYDROCARBONS WITH SULPHUR DIOXIDE Filed May 10, 1927

G. Cattaneo and
P. Jodeck

Inventors.

By: Marks & Clerk
Attys.

Patented June 24, 1930

1,766,281

UNITED STATES PATENT OFFICE

GUISEPPE CATTANEO, OF HILVERSUM, NETHERLANDS, AND PAUL JODECK, OF BERLIN, GERMANY, ASSIGNORS TO ALLGEMEINE GESELLSCHAFT FÜR CHEMISCHE INDUSTRIE M. B. H., OF BERLIN, GERMANY, A CORPORATION OF GERMANY

CONTINUOUS TREATMENT OF HYDROCARBONS WITH SULPHUR DIOXIDE

Application filed May 10, 1927, Serial No. 190,330, and in Germany November 1, 1926.

In the known processes for treating hydrocarbons consisting of mineral oils or oils derived from the distillation of coal or brown coal tars with liquid sulphur dioxide, towers are employed in which the hydrocarbons are introduced at the bottom and flow upwards while the sulphur dioxide is introduced at the top of the tower and flows downwards. When the liquids come into contact with one another, the constituents of the hydrocarbons which are soluble in the sulphur dioxide (the extracts) are removed and collect as a heavy liquid at the base of the tower, while the refined oil, that is the portion undissolved in the sulphur dioxide, flows to the upper end of the tower. The two liquid mediums are in such intimate contact in the tower that some of the sulphur dioxide is carried upward with the refined oil in the form of finely divided drops. This drawback is of considerable importance because the unutilized sulphur dioxide carried away with the hydrocarbons unnecessarily increases the work of the evaporating apparatus in the further treatment of the oils.

According to the invention this drawback is obviated by reducing the velocity of flow of the oil as it leaves the tower. For this purpose the refined oil is allowed to flow into a space having a larger cross-section than that of the tower itself.

In the accompanying drawings, two examples of apparatus suitable for carrying out the invention are shown.

Figure 1:
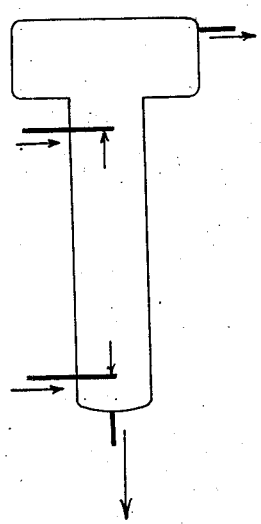

In Fig. 1 a discharge head is provided on the tower of larger cross-section than that of the tower itself.

Figure 2:
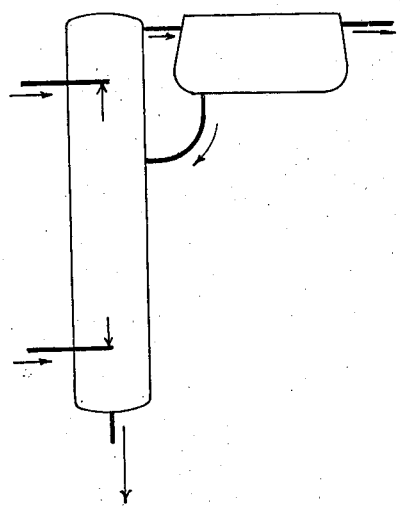

In Fig. 2 the enlarged container is provided by the side of the tower. The tower might also be enlarged in a conical form upwards. The essential feature is that the cross-section of the space in which the refined oil flows from the tower is enlarged for the purpose of reducing the velocity of flow and thereby allowing the particles of sulphur dioxide which have been carried upwards to be separated out completely by deposition or to return to the original direction of flow. If the enlarged container is placed by the side of the tower, the sulphur dioxide is deposited therein and by a suitable device, for example a siphon, is again returned to the cyclical path.

Having now particularly described and ascertained the nature of our said invention and in what manner the same is to be performed, we declare that what we claim is:—

In the process of continuously treating hydrocarbon oils with liquid sulphur dioxide, the steps which comprise introducing oil to be treated into the bottom of a tower, and introducing liquid sulphur dioxide into the upper portion of the tower whereby the oil and sulphur dioxide mix and flow in counter-current relation to each other, and decreasing the linear velocity of the upwardly flowing oil in the upper portion of the tower above the point of entrance of the sulphur dioxide, whereby droplets of liquid sulphur dioxide carried up by the oil are given time to separate from the oil and thus are returned to the oil undergoing treatment.

In testimony whereof we have signed our names to this specification.

GUISEPPE CATTANEO.
PAUL JODECK.